(12) United States Patent
Maini (10) Patent No.: US 11,882,381 B2
(45) Date of Patent: Jan. 23, 2024

(54) COLLECTING AND SHARING LIVE VIDEO AND SCREEN FEEDS OF PARTICIPANTS IN A VIRTUAL COLLABORATION ROOM

(71) Applicant: Global Imports L.L.C., Sammamish, WA (US)

(72) Inventor: Sameer Maini, Sammamish, WA (US)

(73) Assignee: Global Imports L.L.C., Sammamish, WA (US)

( * ) Notice: Subject to any disclaimer, the term of this patent is extended or adjusted under 35 U.S.C. 154(b) by 168 days.

(21) Appl. No.: 17/098,048

(22) Filed: Nov. 13, 2020

(65) Prior Publication Data

US 2022/0053165 A1 Feb. 17, 2022

Related U.S. Application Data

(60) Provisional application No. 63/064,250, filed on Aug. 11, 2020.

(51) Int. Cl.
| | |
|---|---|
| *H04N 7/15* | (2006.01) |
| *G06K 9/00* | (2022.01) |
| *G06V 40/16* | (2022.01) |

(52) U.S. Cl.
CPC .............. *H04N 7/15* (2013.01); *G06V 40/174* (2022.01)

(58) Field of Classification Search
CPC ........ H04N 7/15; H04N 7/152; G06V 40/174; H04L 12/1822
See application file for complete search history.

(56) References Cited

U.S. PATENT DOCUMENTS

| | | | |
|---|---|---|---|
| 9,843,606 B1* | 12/2017 | Vendrow | H04L 65/1101 |
| 2008/0016156 A1* | 1/2008 | Miceli | G06Q 10/10 |
| | | | 709/204 |
| 2012/0262537 A1* | 10/2012 | Baker | H04N 7/15 |
| | | | 348/E7.083 |
| 2013/0309648 A1* | 11/2013 | Park | G09B 5/12 |
| | | | 434/350 |

(Continued)

OTHER PUBLICATIONS

Mr. Lee, NetOp Vision for Chromebooks Classroom Monitoring, Nov. 1, 2019, 3 pages (Year: 2019).*

(Continued)

*Primary Examiner* — Jennifer N Welch
*Assistant Examiner* — Parmanand D Patel
(74) *Attorney, Agent, or Firm* — Perkins Coie LLP (57) ABSTRACT

Systems and methods for sharing data streams in a virtual collaboration room. The method includes receiving a user video data stream from a user device for display to one or more other participants in the virtual collaboration environment and receiving a user screen sharing data stream from the user device for display to the one or more other participants in the collaboration environment. The method further includes providing a participant video data stream and a participant screen sharing data stream associated with each participant of the one or more other participants in the collaboration environment to the user device, the data streams associated with each participant configured for simultaneous display with each other participant data stream at the user device and simultaneous display with the user video data stream and the user screen sharing data stream to the one or more other participants.

23 Claims, 7 Drawing Sheets

(56) References Cited

U.S. PATENT DOCUMENTS

| | | | | |
|---|---|---|---|---|
| 2016/0057388 A1* | 2/2016 | Rung | ............... | H04N 7/15 |
| | | | | 348/14.08 |
| 2016/0072862 A1* | 3/2016 | Bader-Natal | ............ | H04N 7/15 |
| | | | | 715/755 |
| 2016/0165184 A1* | 6/2016 | Aaron | ............... | H04L 12/1822 |
| | | | | 348/14.08 |
| 2018/0295158 A1* | 10/2018 | Faulkner | ............ | H04L 65/1059 |
| 2020/0296147 A1* | 9/2020 | Eliason | ............... | H04L 65/403 |

OTHER PUBLICATIONS

Mr. Lee, NetOp Vision for Chromebooks classroom Monitoring, Nov. 1, 2019, 3 pages (Year: 2016).*

* cited by examiner

COLLECTING AND SHARING LIVE VIDEO AND SCREEN FEEDS OF PARTICIPANTS IN A VIRTUAL COLLABORATION ROOM

CROSS-REFERENCE TO RELATED APPLICATION(S)

The present application claims priority to U.S. Provisional Patent Application No. 63/064,250 filed on Aug. 11, 2020, titled "Collaboration application that enables call center trainers/managers to see multiple video and screen from participant at the same time," and is incorporated herein in its entirety by reference.

TECHNICAL FIELD

Embodiments of the present invention are directed to a screen sharing and video collaboration system and method, and more specifically to a new and useful method for sharing real time screen and video feeds of participants to a moderator or supervisor in a virtual collaboration environment.

BACKGROUND

Due to a rise in telecommuting, remote work, and remote schooling, more and more people are now working from home or attending school from home and utilizing live video streaming and/or screen-sharing services. As a moderator or supervisor (e.g., a supervisor in a call center or a teacher in a classroom), there is challenge in training and monitoring participants of the call while they work or learn. Conventional solutions either allow one-on-one collaboration between the moderator and a participant or group collaboration, but do not allow for one supervisor or moderator to consistently moderate a group of participants by monitoring both video activity and screen activity of each participant. Conventional solutions also do not allow segregation of video/screen data between moderators and participants.

In conventional collaboration software, there is one moderator who shares their screen. To view other participants' screens, the moderator who is presenting stops presenting and then other participants can share their screen.

Furthermore, in conventional collaboration software, what is presented (e.g., a shared screen) by participants is shared to everyone. This can be a distraction for other participants in a focused environment where they are looking at each other participant's video and/or screen and not the moderator(s) video and or screen. Additionally, in conventional collaboration software, when multiple participants are present, it is difficult for the moderator to get feedback of engagement of each of the participants based on the use of facial recognition software.

SUMMARY

Therefore, there is a need for a software application that allows one supervisor or moderator to efficiently monitor multiple participants in a video call, such as a virtual collaboration room. Additionally, if there are multiple participants, the software will provide real time feedback of the engagement of the participants based on facial recognition.

One embodiment provides a computer-implemented method for sharing data streams in a virtual collaboration room. The computer-implemented method includes receiving, at a server, a user video data stream from a user device for display to one or more other participants in the virtual collaboration environment and receiving, at the server, a user screen sharing data stream from the user device for display to the one or more other participants in the virtual collaboration environment. The computer-implemented method further includes providing, with the server, a participant video data stream and a participant screen sharing data stream associated with each participant of the one or more other participants in the virtual collaboration environment to the user device, the participant video data stream and the participant screen sharing data stream associated with each participant configured for simultaneous display with each other participant video data stream and participant screen sharing data stream at the user device and simultaneous display with the user video data stream and the user screen sharing data stream to the one or more other participants.

Another embodiment provides one or more computer-readable media storing instructions that, when executed by an electronic processor, cause the electronic processor to execute a process. The process includes receiving, at a server, a connection from a user device, the connection indicating a moderator is joining a virtual collaboration environment; receiving, at the server, a moderator video data stream from the user device for display to one or more other participants in the virtual collaboration environment; and receiving, at the server, a moderator screen sharing data stream from the user device for display to one or more other participants in the virtual collaboration environment. The process further includes providing, with the server, a participant video data stream and a participant screen sharing data stream associated with each participant of the one or more other participants in the virtual collaboration environment to the user device, the participant video data stream and the participant screen sharing data stream associated with each participant configured for simultaneous display with each other participant video stream and participant screen sharing data stream at the user device and simultaneous display with the user video data stream and the user screen sharing data stream to the one or more other participants, wherein the one or more other participants in the virtual collaboration environment do not receive the participant video data stream and the participant screen sharing data stream associated with other participants of the one or more other participants Yet another embodiment provides a computer-implemented method. The method includes receiving, at a server, a user video data stream from a user device for display to one or more other participants in the virtual collaboration environment; receiving, at the server, a user screen sharing data stream from the user device for display to one or more other participants in the virtual collaboration environment; and providing, with the server, a participant video data stream and a participant screen sharing data stream associated with each participant of the one or more other participants in the virtual collaboration environment to the user device, the participant video data stream and the participant screen sharing data stream associated with each participant configured for simultaneous display with each other participant video stream and participant screen sharing data stream at the user device and simultaneous display with the user video data stream and the user screen sharing data stream to the one or more other participants. The computer-implemented method further includes detecting, from the participant video data stream associated with each participant of the one or more other participants, one or more faces in the participant video data stream; detecting, from the participant video data stream associated with each participant of the one or more participants, a facial expression of each face of the one or more faces; and providing an indicator on the user device of the facial expression of at least one face of the one or more faces.

A further embodiment provides a system for sharing data streams in a virtual collaboration environment. The system includes a user device and a server including an electronic processor. The electronic processor is configured to receive a connection from a user device, the connection indicating a moderator is joining a virtual collaboration environment; receive a moderator video data stream from the user device for display to one or more other participants in the virtual collaboration environment; receive a moderator screen sharing data stream from the user device for display to one or more other participants in the virtual collaboration environment; and provide a participant video data stream and a participant screen sharing data stream associated with each participant of the one or more other participants in the virtual collaboration environment to the user device, the participant video data stream and the participant screen sharing data stream associated with each participant configured for simultaneous display with each other participant video stream and participant screen sharing data stream at the user device, and simultaneous display with the user video data stream and the user screen sharing data stream to the one or more other participants, wherein the one or more other participants in the virtual collaboration environment do not receive the participant video data stream and the participant screen sharing data stream associated with other participants of the one or more other participants. The processor is further configured to detect, from the participant video data stream associated with each participant of the one or more other participants, one or more faces in the participant video data stream; detect, from the participant video data stream associated with each participant of the one or more participants, a facial expression of each face of the one or more faces; and provide an indicator on the user device of the facial expression of at least one face of the one or more faces.

DETAILED DESCRIPTION

The present disclosure describes a system that enables moderators to collaborate with multiple participants by viewing each participant's screen and video simultaneously. In addition, participants are able to view the moderator(s) screen and video along with his or her own screen.

This system enables moderators to receive real-time feedback on participants in a virtual meeting room, including a facial expression of each participant as well as a number of faces detected in each video stream presented to the moderator. This feedback is critical for moderators to judge engagement of participants and detect the presence of other people in the room or at the workstation of each participant.

Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below. Several implementations are discussed below in more details in reference to the figures.

Figure 1:
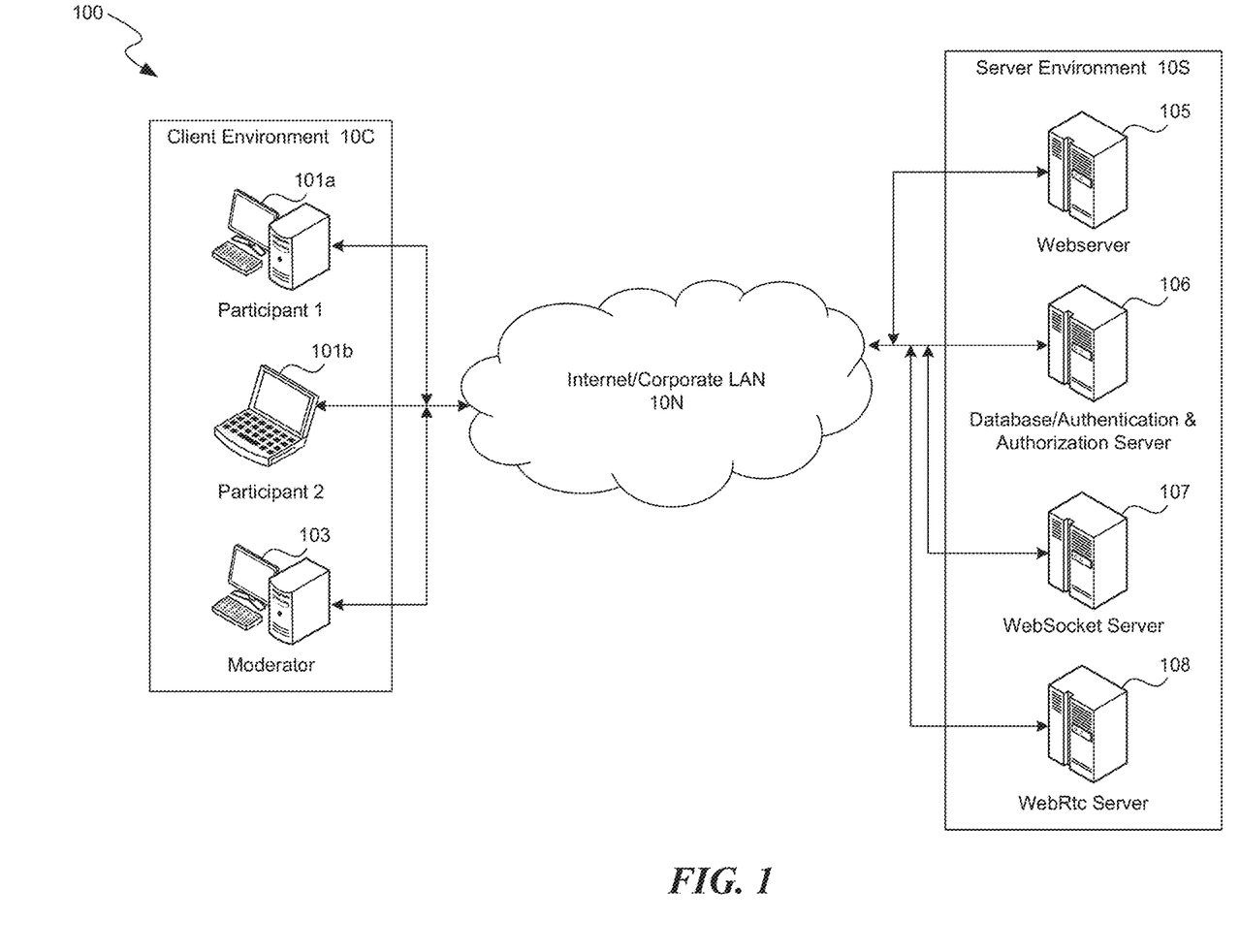
FIG. 1 is a block diagram illustrating an overview of an environment in which some implementations of the invention can operate.

FIG. 1 is a block diagram illustrating an overview of an environment 100 in which some implementations of the disclosed technology can operate. The environment 100 includes a client environment 10C and all the components that moderator and participants (collectively called as users) use, connected to a server environment 10S where all the applications are connected by a network 10N.

Client environment 10C include one or more participants computing devices 100A-B. In the illustrated embodiment, device 101A is a desktop computer with a monitor that has video and audio capability, device 101B is a laptop that has audio and video capability, and device 103 is a moderator computer with a monitor that has video and audio capability (collectively referred to as "the devices"). It is to be understood that the device 101A, the device 101B, and the device 103 may be any form of personal computing device, such as a desktop computer.

The environment 100 includes a web server 105 configured to process Hypertext Transfer Protocol Secure ("https") requests. The web server 105 includes have a public internet protocol "IP") address and a private IP address. The web server 105 is configured to send and receive messages or data streams from other computing devices using various communication protocols, such as https. Database server 106 is a server that is used for authentication and authorization of users and storing of data. WebSocket server 107 is a server that is used to process WebSocket traffic. WebSocket is a computer communications protocol that provides communications over a single transmission control protocol ("TCP"). WebRTC server 108 is a server used to manage all Web Real-Time Communication ("WebRTC") traffic. Each server may include one or more processors, memory, and network interface(s). The servers are configured to communicate with the other servers and the devices within the environment 100 over the network 10N.

These are only examples of some of the devices that may be used in the environment 100 and other embodiments can include other types and/or numbers of computing devices. For example, device 101A may be a thin client (e.g., a low performance computing device optimized for establishing a remote connection with a server) that includes an external web camera. Other examples of computing systems, environments, and/or configurations that may be suitable for use with the technology include, but are not limited to, personal computers, video conference consoles, server computers, handheld or laptop devices, cellular telephones or smart phones, tablet devices, multiprocessor systems, microprocessor-based systems, set-top boxes, programmable consumer electronics, network PCs, minicomputers, mainframe computers, distributed computing environments that include any of the above systems or devise, or the like.

In some implementations the web server 105, the database server 106, the WebSocket server 107, and the WebRTC server 108 (collectively referred to as "the servers") may all be deployed on a single virtual or physical machine. In other embodiments, although each server is displayed logically as a single server, the servers can each be a distributed computing environment encompassing multiple computing devices located at the same or at geographically disparate physical locations.

In some implementations, the database server 106 may be two separate servers, one server used for storing database transactions and the other server used as an authentication and authorization server, which could be an enterprise Lightweight Directory Access Protocol ("LDAP") server or any other identity management server that would provide authentication and authorization capabilities (e.g., used to allow users to log in to the environment).

The network 10N may be a local area network (LAN), a wide are network (WAN) or any other form of suitable wired or wireless communication means, (e.g., the client environment 10C may connect to the server environment 10S using a public Wi-Fi connection).

Figure 2:
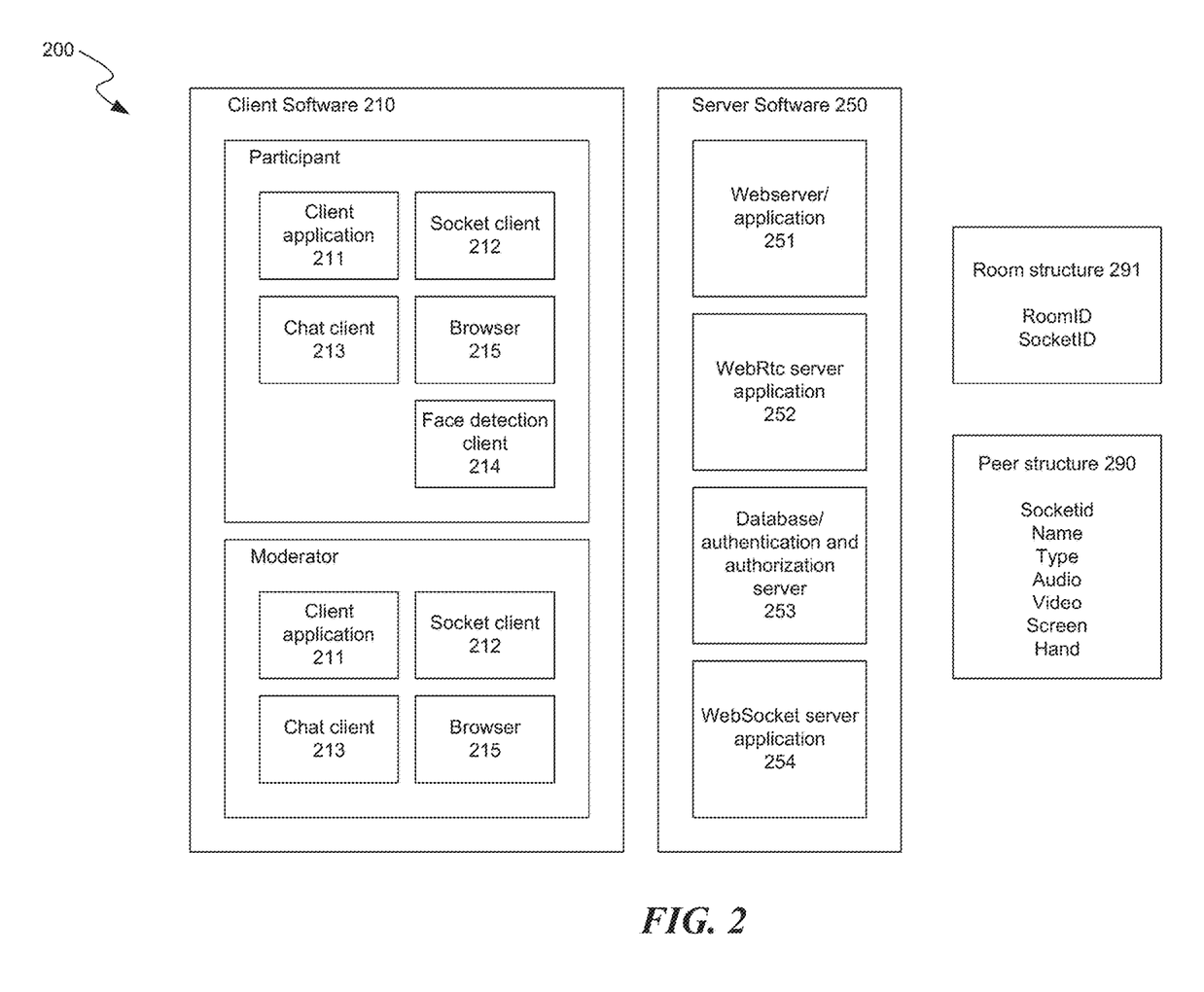
FIG. 2 is a block diagram illustrating various software components of an environment in which some implementations can operate.

FIG. 2 is a block diagram illustrating components 200 which in some implementations can be used in a system, such as system 100, employing the disclosed technology. The components 200 may include commonly off the shelf products ("COTS") and/or one or more specialized software applications. As discussed above, the system 100 implementing the disclosed technology may use various hardware components mentioned in regards to client environment 10C and server environment 10S.

Client application 211 is a software application responsible for presentation of video, screen, and audio streams for users, such as the moderator and the participants.

Socket client 212 is responsible for establishing a socket on a user's computer (e.g., device 101a), allowing communication between the user's computer and a socket server 254 in the form of data streams. Data streams from the user's computer are passed via the socket to the socket server 254.

Chat client 213 is responsible for taking data from users in a chat interface on the user's computer and passing it to socket client 212 and receiving data from the socket client 212. The chat client 213 is also responsible for displaying the data on the client application 211.

Face detection client 214 is loaded on the client application 211 for participants and gathers data about a number of faces detected from the webcam of the device associated with each participant. The face detection client 214 is also responsible for facial expression detection of participants. The face detection client 214 uses, for example, one or more machine learning platforms (such as Google Tensorflow) and one or more facial and/or object recognition algorithms, such as SSD Mobilenet V1 and ResNet-34 to determine a number of faces in the video stream and the expression of each face in the video stream by, for example, identifying facial features by extracting landmarks from the video stream of the participant. The face detection client 214 detects the expression of the face of the participants using, for example, the position of the eyes, the nose, the eyebrows, or other facial features of the participants. Based on the mentioned algorithms or other, similar algorithms, the face detection client 214 predicts a facial expression of the participant, for example by creating one or more scores based on the input to the algorithm(s), where the scores indicate probabilities that the participant is making a particular facial expression. The face detection client 214 passes both the number of faces and the facial expression of each face to the socket client 212. In one embodiment, the face detection client 214 then sends the highest probability score to the socket client 212.

Face detection client 214 enables the moderator to observe the level of engagement of the participants and is also critical for organizations that wish to protect confidential information that remote employees may be working on from unauthorized users who may be looking at the participant's screen. On the moderator client application 211, the color of the participant's name will change based on the participant's facial expression being detected by the face detection client 214, therefore alerting the moderator that the participant is distracted and not looking at the screen or away from their desk. In other embodiments, a different method of alerting the moderator, such as playing an audible tone or providing a different visual indication (e.g., a pop-up window, an alert badge, a banner, or the like) that the participant is distracted. The moderator client application 211 will also alert the moderator by adding of the number of faces being detected by the face detection client 214 next to each participant's name so the moderator is aware that there is another person in the video stream looking at the data on the participant's screen. Additionally, a participant's client application 211 includes an icon for raising a hand which alerts the moderator client application 211 that the participant needs attention or assistance.

Web Browser 215 may be any WebRTC-enabled COTS web browser, such as Google Chrome™, Mozilla Firefox™, Microsoft Edge™, and others.

Web server application 251 is responsible for serving http or http requests from client application 211. The web server application 251 gathers requests from the client application 211 and routes the requests to appropriate server software on the servers or to the appropriate server in the event the servers are all separate computing components.

WebRTC application 252 is a software application responsible for managing all WebRTC related activities, such as video, audio, and screen sharing streams. The WebRTC application 252 is hosted on the WebRTC server 108.

Database/authentication and authorization application 253 is a software application used for storing user profile information, which includes username, password and user category or role (moderator or participant).

Socket application 254 is a software application responsible for sending and receiving data to and from the socket client 212. Each new connection from the socket client 212 creates a peer in the socket application 254. The object that is created includes a data structure defined in peer data structure 290. The peer data structure 290 is used to track various SocketID numbers and what each SocketID is used for. Table 1 below describes fields of the peer data structure 290. The socket application 254 uses the peer data structure 290 of each peer with a created socket (e.g., each of the devices) to identify which users and streams are associated with the connection between a particular device and the socket application 254. Therefore, each user can have multiple peers depending on a type of data stream (Audio/Video/Screen) and a number of streams associated with the user, as each stream has its own peer.

TABLE 1

| Field Name | Definition |
| --- | --- |
| SocketID | Unique value generated by sockets server for each new connection |
| Name | Name of the user to whom this connection belongs to |
| Type | Whether the user is a Moderator or Participant |
| Audio | True if this SocketID is for audio |
| Video | True if this SocketID is used for Video |
| Screen | True if this SocketID is used to show a raised hand |

When a user selects a collaboration room to join (as described below), the socket application 254 checks to see if the selected collaboration room exists. If the collaboration room does not exist, a new room data structure 291 is created. The fields of the room data structure 291 are shown below in Table 2. In some embodiments, only moderators or supervisors can create a new room data structure. As new participants join an existing collaboration room, the socket server software 254 adds the SocketID of the peer data structure 290 associated with the user to the room.

TABLE 2

| Field Name | Definition |
| --- | --- |
| RoomID | Unique value given, if it does not exist. |
| SocketID | SocketID of the peer being connected from 290 |

Those skilled in the art will appreciate that the components illustrated in FIG. 1-2 described above, and in each of the flow diagrams discussed below may be altered in a variety of ways. For example, the socket application 254 could be replaced with a Representational State Transfer ("Rest") Application Programming Interface ("API") to handle all exchanges of data between the client application 211 and the socket application 254.

Figure 3:
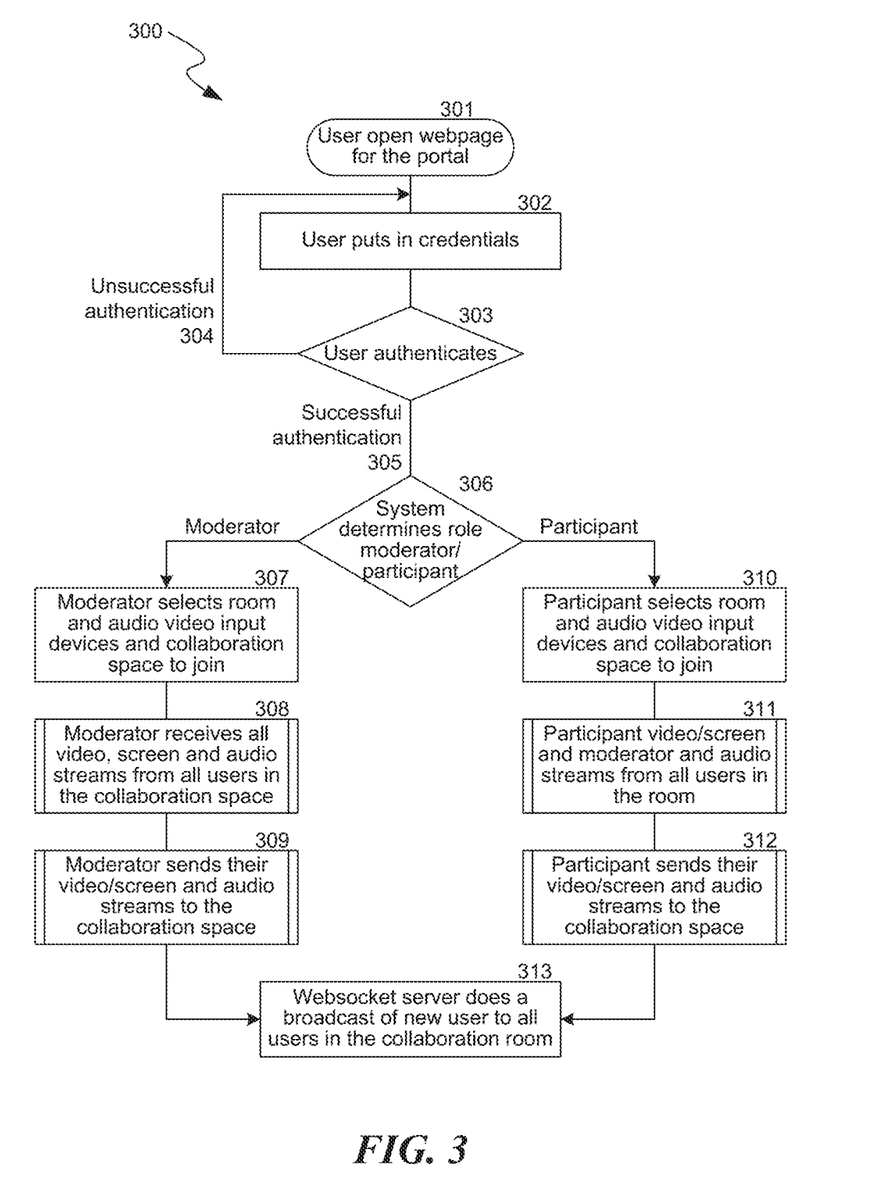
FIG. 3 is a flow diagram illustrating a process for collecting and sharing live video and screen feeds of participants used in some implementations.

FIG. 3 is a flow diagram illustrating a process 300 for collecting and sharing live audio, video, and screen feeds of participants to a moderator according to one embodiment. Process 300 begin at block 301. At block 301, a user opens a COTS browser on the associated user device (such as device 101A). The user then enters the Uniform Resource Locator ("URL") of the client application 211. The web server application 251 responds back to a Rest API call from the browser and launches client application 211.

At block 302, the user inputs login credentials via the browser into the client application 211. The client application 211 passes the login credentials to the web server application 251. The web server application 251 queries the database/authentication and authorization application 253. If user is successfully authenticated (305) (e.g., the login credentials exist in the database/authentication and authorization application) at block 303, the client Application 211 receives profile information associated with the user back from the web server application 251 (at block 306). If the user is not successfully authenticated (304) the client application 211, the user is redirected to the initial web page presented when the URL was input to access the client application 211. In some embodiments, the user may also be prompted or alerted that the login credentials were not accepted.

At block 307, if the user is a moderator or supervisor, the user is prompted to select which audio device and video device will be used as input. A similar process occurs at block 310 if the user is a participant. In both situations, the user is also prompted to select a collaboration room to join. This information will be gathered by the client application 211 and passed to socket client 212 which will send the data to socket application 254. The socket application 254 will check to see if the selected collaboration room exists based on room data structure 291 information stored in the socket application 254 and, if the selected collaboration room does not exist, the socket application 254 will create a new collaboration room.

Figure 7:
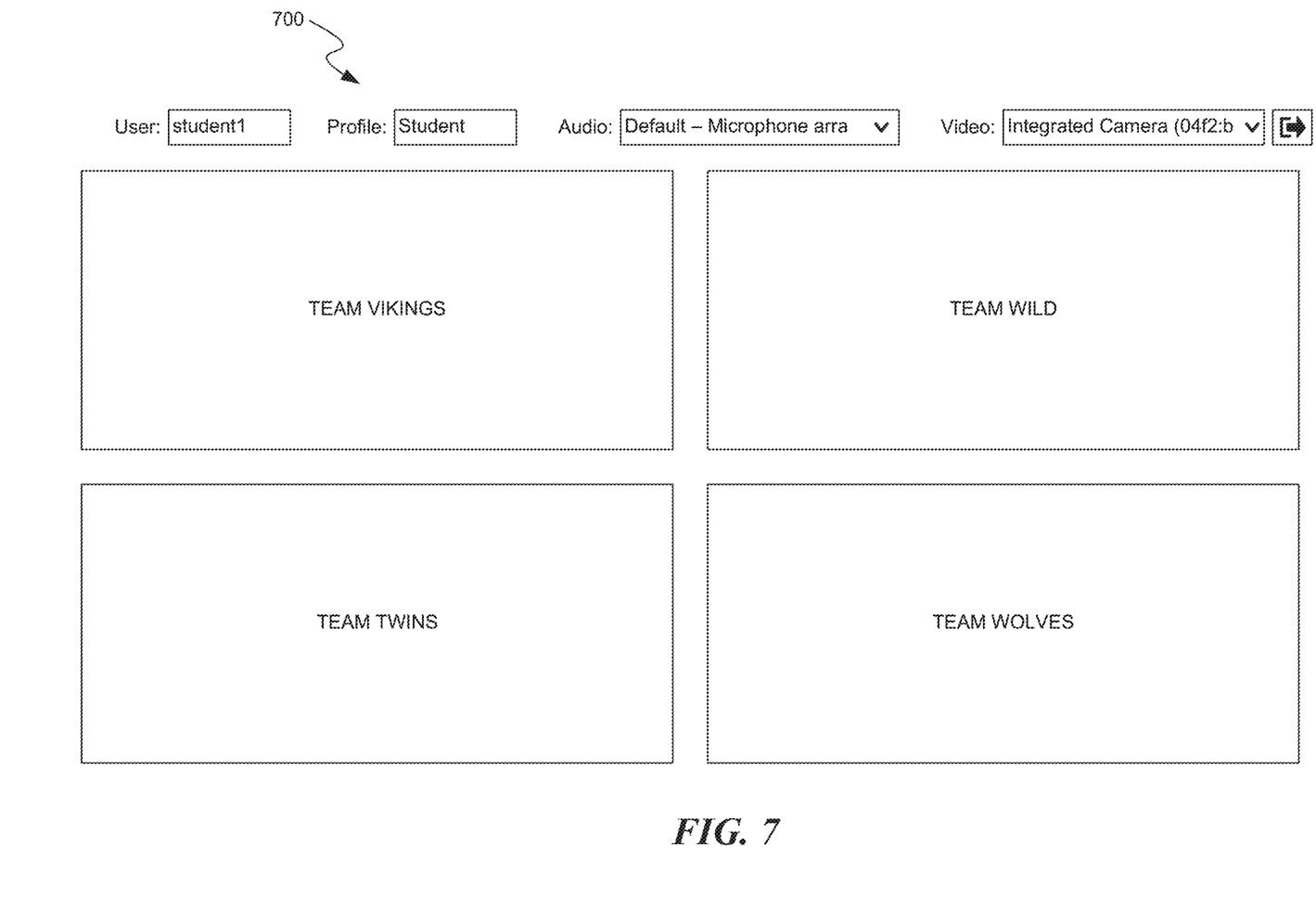
FIG. 7 is a block diagram of a web page displayed after user authentication where a user can select an audio device and video device for input and a collaboration environment to join.

FIG. 7 is an example of a web page 700 where a user can both select audio and video source devices and select a collaboration room to join according to one embodiment. In this example username student1, whose profile is student (participant), has selected the default microphone as an audio input and an integrated camera as a video source. The user can also select any one of the four collaboration rooms to start collaborating with other users in the same collaboration room.

Returning to FIG. 3, at block 308, socket application 254 retrieves each SocketID that are associated with the selected collaboration room and passes the list of SocketIDs to the socket client 212. Socket client 212 will passes the audio, video, and/or screen sharing data streams associated with each SocketID to the client application 211. The client application 211 also receives WebRTC traffic from WebRTC application 252.

At block 309, when a moderator associated with the selected collaboration room starts to share his video, screen, and audio using his client application 211, the client application 211 will send data to the socket client 212, which in turn sends that data to the socket application 254. Socket application 254 creates a new peer for each one of the input streams (audio, video, screen).

Figure 4:
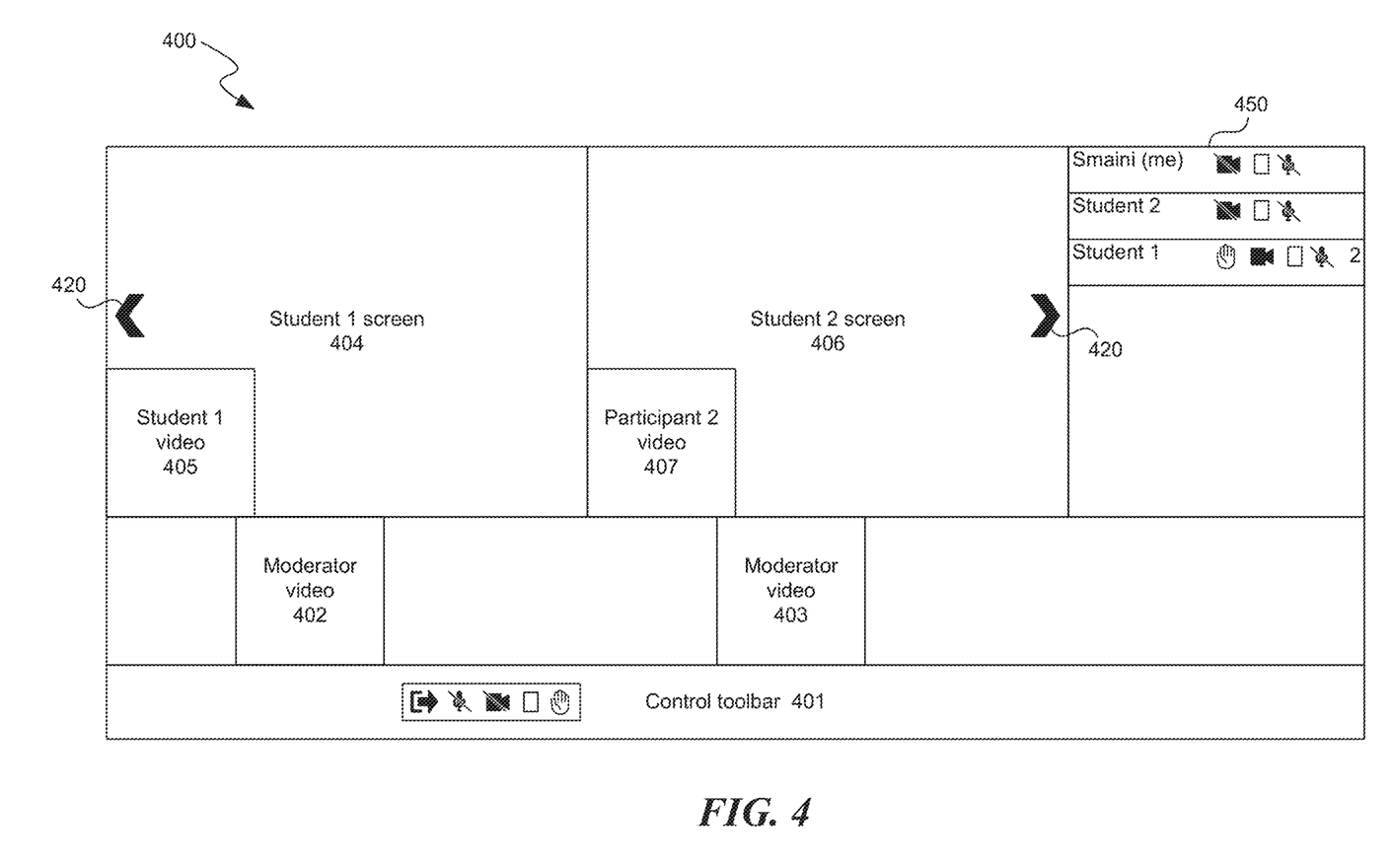
FIG. 4 is a block diagram of a moderator's screen with multiple participants in a collaboration room.

FIG. 4 illustrates an example of a moderator screen 400 according to one embodiment. The moderator screen 400 illustrates the collaboration room as the collaboration room receives multiple video and screen data streams from participants via the WebRTC server 108. At the bottom of the moderator screen 400 is a toolbar 401. The toolbar 401 includes all audio, video, and screen sharing controls, such as mute, stop video display, start and stop screen sharing functionality, and others. The moderator's own video and screen are displayed in sections 402 and 403, respectively. FIG. 4 also illustrates a layout with two participants and the screen and video streams associated with each of the two participants. The screen of Participant One is shown in section 404 and the video of Participant One is shown in section 405. The screen of Participant Two is shown in section 406 and the video of Participant Two is shown in section 407. As the number of participants increase, each participant will have their own section of screen and video displayed in the collaboration room on the moderator screen 400.

This layout can be customized. For example, a number of participants whose video and screen sharing streams are shown can be limited to a defined number per page. If the number of participants is greater than this defined number per page, the moderator can use arrows 420 to move between different pages. As an example, if you have nine participants as a defined number of participants on a page and have sixteen participants in the collaboration room, the moderator will have the ability to look at all sixteen participants by clicking on arrows 420 to move to the next page.

This is different from conventional video collaboration software applications, which a defined number of participants and have no ability to see all participants via a paging mechanism.

The method of showing multiple participants' screens and video for the moderator to oversee multiple participants also differ from conventional video collaboration software applications, which show only video of participants and the moderator being the one that typically shares his or her screen. In contrast, the disclosed invention enables the moderator to see what the participants activities are via both screen sharing and video. This can be very useful in a training environment and well as in remote collaboration environments including employees, students, supervisors, and moderators.

In another embodiment it is possible to have multiple moderators in a single collaboration room. In this embodiment, in addition to each moderator seeing each participant's screen sharing stream and video stream, each moderator can also see the other moderators' screen streams and video streams.

FIG. 4 also illustrates the chat client 213 (in section 450), where all the participants' names are displayed, and what their control toolbar status is will be displayed (e.g., if the participant is muted, has stopped sharing video, and the like). This is also the section where face detection data is also displayed. In this example, one collaboration room includes a moderator with the username smaini and two participants with usernames student1 and student2, respectively. Student1 is sharing video and has also raised their hand. Face detection application 214 is detecting a normal or neutral facial expression for student1 and is detecting two different faces in the video stream of student 1. The number of faces detected in each video stream is displayed next to the participant's name, and the color that the participant's name is being displayed in is based on the participant's facial expression. As described above, a different indicator (such as an audio tone, a pop-up window, a banner, an alert badge, or another visual indicator) may be provided instead.

Table 3 illustrates the relationship between a detected facial expression of a participant and a color to display that participant's name in.

TABLE 3

| Expression | Color |
| --- | --- |
| Neutral | Lawn Green |
| Happy | Dark Green |
| Sad | Orange |
| Angry | Dark red |
| Fearful | Orange Red |
| Disgusted | Yellow |
| Surprised | Blue |

At block 311 socket server 254 will retrieve all audio SocketIDs and moderator SocketIDs for the moderator(s) that is present for the selected collaboration room. Socket client 212 will pass the streams to client application 211 which will receive WebRTC traffic from WebRTC application 252, which then allows the client application 211 to display the moderator's screen and video. At block 312, the participant sends an audio stream, a video stream, and a screen sharing stream to the collaboration room to share to the moderator.

Figure 5:
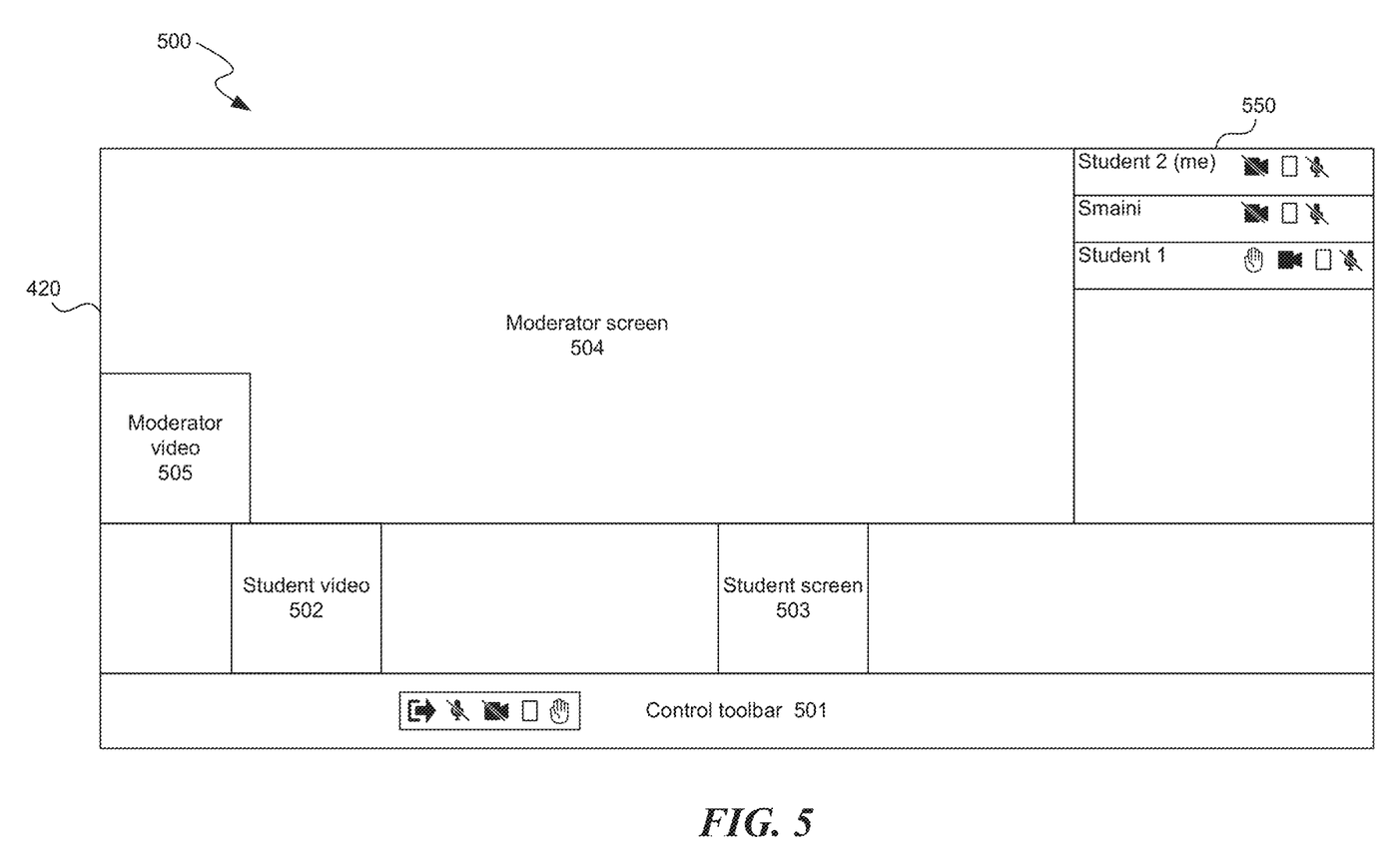
FIG. 5 is a block diagram of a participant's screen.

FIG. 5 illustrates an example of a participant screen 500 as it receives moderator video/screen streams from the WebRTC server 108 according to one embodiment.

Section 501 is a participant toolbar. The participant toolbar 501 also includes the option to raise a hand for chat purposes.

Section 502 and Section 503 are similar to section 402 and section 403, but instead of showing the moderator's screen and video, the participant's own video and screen streams are shown.

Section 504 shows participant screen and Section 505 shows the moderator's stream and moderator's video, respectively. This section is different from moderator screen described above as a participant does not have the ability to see other participants. This enables the participants to focus on moderator content and not be distracted by other participants.

Section 550 is the participants' chat client 213. In contrast to the moderator chat client, the participants' chat client 213 cannot see participant name color (based on participant facial expression) or number of faces detected in the video stream of the participant, as this is information privileged only to the moderator. This is done to protect other participants' privacy. Unlike conventional collaboration application where all participants can see other participants' video and screen being shared, this collaboration application only shows the moderator details of participants' video and screen streams.

At block 313, the socket application 254 broadcasts a notification to all users in the collaboration room when a new user joins. Conventional collaboration application typically use a polling mechanism where the collaboration application would query the WebRTC application 252 for all the available streams at a given time interval. Broadcasting when new users join in reduces the bandwidth needed as compared to a conventional collaboration application polling for peers at a specific interval, as now data will only be pushed to client applications when there is a change.

Figure 6:
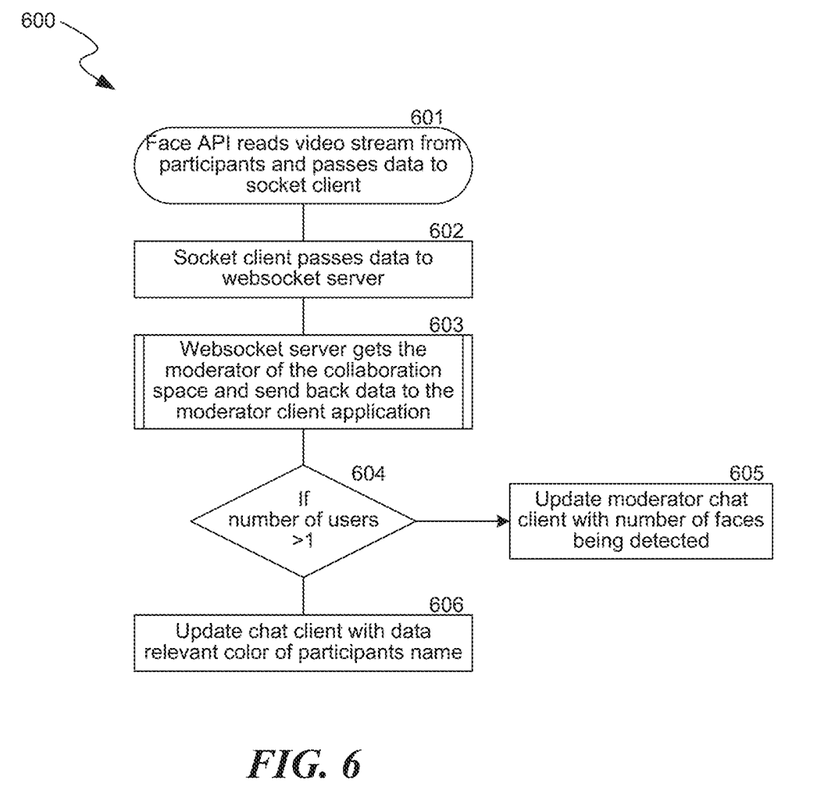
FIG. 6 is a flow diagram illustrating a process used for displaying to the moderator(s) participants facial expression and number of faces detected on each participants webcam.

FIG. 6 is a flow diagram illustrating a process 600 used for displaying to a moderator in a collaboration room a number of faces and their expressions in each participant video stream according to one embodiment.

Process 600 begins at block 601. In some embodiments, block 601 is initiated as part of block 312 when a participant starts sharing their video stream. At block 602, the socket client 212 sends the participant data to the socket application 254. Then, at block 603, the socket application 254 uses peer data structure 290 and room data structure 291 to determine who the moderator(s) are for a selected collaboration room and sends the data back to the moderator client application 211. If the number of users in the collaboration room that are not moderators (e.g., participants) is greater than or equal to one (block 604), the face detection client 214 starts detecting presence of a number of faces (block 605) and corresponding facial expressions of each face (block 606) in the video stream of the participant. Face detection client 214 then uses the socket client 212 to send data as an object to the socket application 254. Based on the received data from the face detection client 214, the moderator's user interface is updated to show how many faces are present in each video stream and the color of each participant's name is changed based on the facial expression of the participant as described above.

The advantage of utilizing facial detection on client environment 10C is that the use of facial detection on the devices and not the servers saves on the computational needs on the server environment 10S. This allows for faster processing of the information at the servers instead of delays that would occur if the video stream from participants had to be managed and/or analyzed at the server environment 10S. There also is a considerable reduction in bandwidth needed at the server environment 10S as the server environment 10S only receives a small payload of data (e.g., 80 bytes/s)

instead of video streams of a larger size (e.g., 5 Mbps and higher depending of quality of video being transmitted).

Several implementations of the disclosed technology are described above in reference to the figures. The computing devices on which the described technology may be implemented can be include one or more central processing units, memory, input devices (e.g., keyboard and pointing devices), output devices (e.g., display drives), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial up connection. Thus, computer-readable media can comprise computer-readable storage media (e.g., "non-transitory" media) and computer-readable transmission media.

References in this specification to "implementation" (e.g., "some implementation", "various implementation", "an implementation," etc.) means that a particular feature, structure or characteristic described in connection with the implementation is included in at least one of the implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison ha a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "sends the highest probability score" can be understood to mean selecting a probability score that has the highest value among a group of generated probability scores.

As used herein, the word "or" refers to any possible permutation of a set of items. For example, the phrase "A, B, or C" refers to at least one of A, B, and C, or any combination therefore, such as any of A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A computer-implemented method for sharing data streams in a virtual collaboration environment, the computer-implemented method comprising:
   receiving, at a server, a user video data stream from a first user device associated with a first user for the virtual collaboration environment for display to a plurality of other participants in the virtual collaboration environment;
   receiving, at the server, a user screen sharing data stream from the first user device for display to the plurality of other participants in the virtual collaboration environment;
   for each individual participant of the plurality of other participants:
      providing to the first user device, via the server, a participant video data stream, a participant screen sharing data stream, and identification information and a control toolbar status of the individual participant received from a participant user device associated with the individual participant, wherein:
         the participant screen sharing data stream allows the first user to monitor a screen of the participant user device associated with the individual participant,
         the participant video data stream, the participant screen sharing data stream, and the identification information and the control toolbar status of the individual participant are configured for simultaneous display with each other participant video data stream, participant screen sharing data stream, and the identification information and the control toolbar status from the plurality of other participants at the first user device; and
      simultaneous with the providing to the first user device, providing to the individual participant, via the server, a display of the user video data stream and the user screen sharing data stream from the first user device;
      wherein the control toolbar status includes an indication of whether the individual participant is muted, whether the individual participant is sharing video, and whether the individual participant has raised a hand.

2. The computer-implemented method of claim 1, further comprising receiving, at the server, a user audio data stream from the first user device.

3. The computer-implemented method of claim 1, further comprising, for each individual participant of the plurality of other participants;
   providing, with the server, a participant audio data stream associated with the individual participant to the first user device.

4. The computer-implemented method of claim 1, further comprising:
provilding a user interface to the user on the first user device, the user interface comprising the participant screen sharing data stream of each individual participant of the plurality of other participants in the virtual collaboration environment, the participant video data stream of each individual participant of the plurality of other participants in the virtual collaboration environment, and the identification information and the control toolbar status of each individual participant of the plurality of other participants in the virtual collaboration environment.

5. The computer-implemented method of claim 4, further comprising:
detecting, from the participant video data stream associated with a first individual participant of the plurality of other participants, one or more faces in the participant video data stream; and
detecting, from the participant video data stream associated with the first individual participant, a facial expression of each face of the one or more faces.

6. The computer-implemented method of claim 4, further comprising detecting, from the participant video data stream associated with a first individual participant of the plurality of other participants, a number of faces that are in the participant video data stream, wherein the user interface further comprises an indicator of the number of faces detected in the participant video data stream being displayed next to the identification information and the control toolbar status.

7. The computer-implemented method of claim 5 wherein the user interface is configured to display a subset of the plurality of the other participants at a time, wherein the first individual participant of the plurality of other participants is in a non-displayed subset of plurality of other participants, and wherein computer-implemented the method further comprises:
providing an indicator to the first user device based on the facial expression of each face of the one or more faces.

8. The computer-implemented method of claim 7, wherein the indicator is at least one of an audio indicator and a visual indicator.

9. One or more non-transitory computer-readable media storing instructions that, when executed by an electronic processor, cause the electronic processor to execute a process, the processing comprising:
receiving, at a server, a connection from a first user device, the connection indicating a first user is joining a virtual collaboration environment;
receiving, at the server, a first video data stream from the first user device for display to a plurality of participants in the virtual collaboration environment;
receiving, at the server, a first screen sharing data stream from the first user device for display to the plurality of participants in the virtual collaboration environment; and
for each individual participant in the plurality of participants:
providing to the first user device, via the server, a participant video data stream associated with the individual participant, a participant screen sharing data stream associated with the individual participant, and identification information and a control toolbar status of the individual participant, wherein:
the participant screen sharing data stream allows the first user to monitor a screen of a participant user device associated with the individual participant,
wherein the control toolbar status includes an indication of whether the individual participant is muted, whether the individual participant is sharing video, and whether the individual participant has raised a hand, and
the participant video data stream, the participant screen sharing data stream, and the identification information and the control toolbar status of the individual participant are configured for simultaneous display at the first user device with participant video data stream, participant screen sharing data stream, and the identification information and the control toolbar status associated with the other participants of the plurality of participants; and
simultaneous with the providing to the first user device, providing to each participant of the plurality of participants, via the server, a display of the first user video data stream and the first user screen sharing data stream,
wherein the individual participant does not receive the participant video data stream and the participant screen sharing data stream associated with the other participants of the plurality of participants.

10. The non-transitory one or more computer-readable media of claim 9, wherein the connection indicates that the first user is joining the virtual collaboration environment based on a login credential.

11. The non-transitory one or more computer-readable media of claim 10, wherein
a user interface is presented to the user on the first user device, the user interface including a display of the participant video data stream and the participant screen sharing data stream associated with each individual participant of the plurality participants.

12. A computer-implemented method for sharing data streams in a virtual collaboration environment, the computer-implemented method comprising:
receiving, at a server, a first user video data stream from a first user device for display to a plurality of participants in the virtual collaboration environment;
receiving, at the server, a first user screen sharing data stream from the first user device for display to a plurality of participants in the virtual collaboration environment;
for each individual participant in the plurality of participants in the virtual collaboration environment:
providing to the first user device, via the server, a second participant video data stream, a second participant screen sharing data stream, and identification information and a control toolbar status each individually associated with the individual participant, wherein the participant screen sharing data stream allows a user of the first user device to view a screen of a participant user device, wherein the control toolbar status includes an indication of whether the individual participant is muted, whether the individual participant is sharing video, and whether the individual participant has raised a hand, wherein the participant video data stream, the participant screen sharing data stream, and identification information and a control toolbar status are configured for simultaneous display, at the first user device, with other participant video data stream and participant screen sharing data stream from other participants in the plurality of participants, and wherein the first user device is configured to display a subset of the plurality of participants at a time; and simultaneous with the providing to the first user device, providing to the individual participant, via the server, a display of the first user video data stream and the first user screen sharing data stream;

detecting, from the second participant video data stream associated with a non-displayed participant of the plurality of participants, two or more faces in the participant video data stream;

detecting, from the participant video data stream associated with the non-displayed participant of the plurality of participants, a facial expression of each face of the one or more faces; and providing an indicator on the first user device of the detected facial expression of at least one face of the one or more faces, wherein the indicator is separate from the participant video data stream to alert the first user about the detected facial expression of at least one face of the one or more faces associated with the non-displayed participant of the plurality of participants.

13. The computer-implemented method of claim 12, wherein the indicator is an audio tone.

14. The computer-implemented method of claim 12, wherein the indicator is a visual indicator displayed on a user interface of the first user device.

15. The computer-implemented method of claim 14, wherein the indicator includes changing a color of a name of the participant associated with the video data stream on the user interface.

16. A system for sharing data streams in a virtual collaboration environment, the system comprising:
a user device associated with a first user of the virtual collaboration environment; and
a server including an electronic processor, the electronic processor configured to:
receive a connection from the user device, the connection indicating the first user is joining the virtual collaboration environment;
receive a first video data stream from the user device for display to two or more participants in the virtual collaboration environment;
receive a first screen sharing data stream from the user device for display to the two or more participants in the virtual collaboration environment;
for each individual participant of the two or more participants, provide, to the user device, a participant video data stream, a participant screen sharing data stream, and identification information and a control toolbar status individually associated with the individual participant, wherein:
the participant screen sharing data stream allows the first user to monitor a screen of a participant user device associated with the individual participant,
the control toolbar status includes an indication of whether the individual participant is muted, whether the individual participant is sharing video, and whether the individual participant has raised a hand, and
the participant video data stream, the participant screen sharing data stream, and the identification information and the control toolbar status are configured for simultaneous display with each other participant video data stream, participant screen sharing data stream, and control toolbar status from other participants in the two or more participants at the user device; and simultaneous with the providing to the user device, providing to each participant of the two or more participants via the server a display of the user video data stream and the user screen sharing data stream, wherein the individual participant does not receive the participant video data stream and the participant screen sharing data stream individually associated with the other participants of the two or more participants; and for a first participant from the two or more participants,
detect, from the participant video data stream individually associated with the first participant from the two or more participants, one or more faces in the participant video data stream;
detect, from the participant video data stream individually associated the first participant from the two or more participants, a facial expression of each face of the one or more faces; and
provide an indicator on the user device of the detected facial expression of at least one face of the one or more faces to inform the monitor of the detected facial expression.

17. The system of claim 16, wherein the indicator is an audio indicator.

18. The system of claim 16, wherein the indicator is a visual indicator displayed on a user interface of the user device.

19. The system of claim 18, wherein the indicator includes changing a color of a name of the participant associated with the participant video data stream on the user interface.

20. The system of claim 16 wherein the user device is configured to display a subset of the two or more participants at a time, and wherein the indicator is associated with a non-displayed participant to alert the first user about the detected facial expression.

21. A computer-implemented method for sharing data streams in a virtual collaboration environment, the computer-implemented method comprising:
for each individual participant in a plurality of participants in the virtual collaboration environment:
receiving, at a server, a participant video data stream from a user device associated with the individual participant;
receiving, at the server, a participant screen sharing data stream from the participant user device associated with the individual participant;
receiving, at the server, a control toolbar status from the participant user device associated with the individual participant, wherein the control toolbar status includes an indication of whether the individual participant is muted, whether the individual participant is sharing video, and whether the individual participant has raised a hand; and
providing to a first user device associated with a moderator or supervisor, via server, the participant video data stream the participant screen sharing data stream, and the control toolbar status in real-time, wherein:
the participant screen sharing data stream allows the moderator or supervisor to view a screen of the participant user device associated with the individual participant in real-time, and
the participant video data stream, the participant screen sharing data stream, and the control toolbar status are configured for simultaneous display at the first user device with each other participant video data stream, participant screen sharing data stream, and control toolbar status from other participants in the plurality of participants.

22. The computer-implemented method of claim 21, further comprising:
receiving, at the server, a user video data stream from the first user device;
receiving, at the server, a user screen sharing data stream from the first user device; and
for each individual participant in a plurality of participants in the virtual collaboration environment, providing to the individual participant, via the server, a display of the user video data stream and the user screen sharing data stream from the first user device in real-time.

23. The computer-implemented method of claim 21, further comprising, for each individual participant of the plurality of other participants:
providing to the first user device, with the server, a participant audio data stream associated with the individual participant in real-time.

* * * * *